United States Patent [19]

Kania et al.

[11] Patent Number: 5,241,001
[45] Date of Patent: Aug. 31, 1993

[54] COATING COMPOSITION OF AZIRIDINYL POLYMER AND EPOXY POLYMER(S)

[75] Inventors: Charles M. Kania, Natrona Heights; Padmanabhan Sundararaman, Allison Park; Joseph M. Carney, Pittsburgh; Stephen J. Thomas, Aspinwall, all of Pa.

[73] Assignee: PPG Industries, Inc., Pittsburgh, Pa.

[21] Appl. No.: 904,083

[22] Filed: Jun. 25, 1992

Related U.S. Application Data

[63] Continuation-in-part of Ser. No. 676,014, Mar. 27, 1991, abandoned.

[51] Int. Cl.$^5$ .............. C08L 33/14; C08L 63/00; C08L 75/02; C08L 75/06
[52] U.S. Cl. .................. 525/111; 525/131; 525/208; 525/452; 525/454; 525/108; 427/327; 427/410; 427/421; 427/435
[58] Field of Search .............. 525/127, 128, 131, 452, 525/454, 111, 206, 208, 108

[56] References Cited

U.S. PATENT DOCUMENTS

| | | | |
|---|---|---|---|
| Re. 29,586 | 3/1978 | Merlino et al. | 525/526 |
| 4,070,354 | 1/1978 | Dick et al. | 528/92 |
| 4,656,217 | 4/1987 | Sugiura et al. | 524/430 |

*Primary Examiner*—Robert E. Sellers
*Attorney, Agent, or Firm*—Joseph Carducci; Linda Pingitore

[57] ABSTRACT

Isocyanate-free coating compositions, capable of forming a durable coating under ambient conditions, are claimed comprising (A) at least one polymer, oligomer or combinations thereof selected from the group consisting of acrylic, urethane and urea polymers and oligomers having a number average molecular weight of at least about 100 and bearing at least two aziridinyl groups defined by the following structural formula:

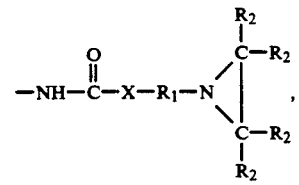

wherein
X represents O, S, NH, NR, wherein R represents an alkyl having from one to 12 carbon atoms, or higher, or phenyl,
$R_1$ represents $(CH_2)_{m_1}$, $m_1$ being an integer ranging from 1 to 3 and
$R_2$ represents H, $CH_3$ or combinations thereof; and
a member selected from the group consisting of (B) and (C) wherein
(B) is at least one polymer, oligomer or combinations thereof selected from the group consisting of acrylic, urethane and urea polymers and oligomers having a number average molecular weight of at least about 100 and bearing at least two groups selected from epoxy groups defined by one of the following structural formulas:

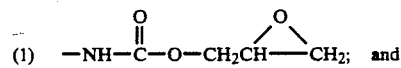

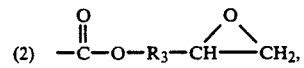

wherein $R_3$ represents $(CH_2)_{m_2}$, $m_2$ being an integer ranging from 1 to 2; and
wherein $R_3$ represents $(CH_2)_{m_2}$, $m_2$ being an integer ranging from 1 to 2; and
(C) is a polymer or oligomer represented by the following structural formula:

(Abstract continued on next page.)

-continued
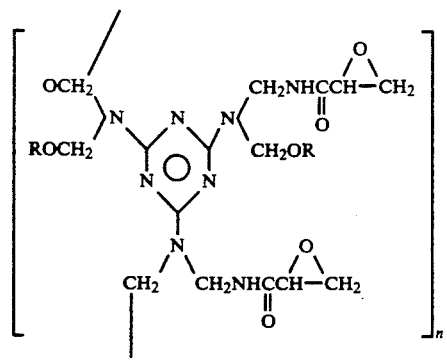
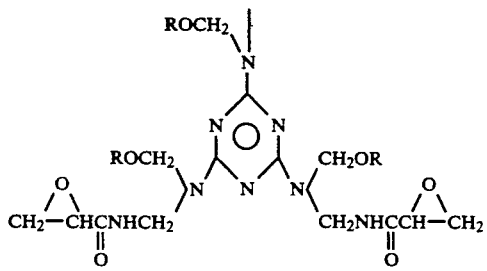
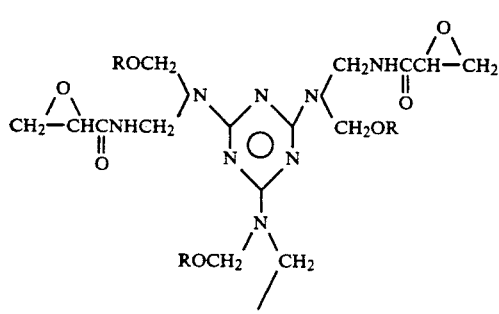
wherein R represents alkyl having from one to 20 carbon atoms and n=0–20.
Processes for coating a substrate using such compositions are also claimed.
18 Claims, No Drawings

COATING COMPOSITION OF AZIRIDINYL POLYMER AND EPOXY POLYMER(S)

CROSS REFERENCE TO RELATED APPLICATIONS

This application is a continuation in part of U.S. patent application Ser. No. 07/676,014 filed Mar. 27, 1991 abandoned, entitled Non-Isocyanate Ambient Temperature Curable Coating Compositions.

BACKGROUND OF THE INVENTION

1. Field of the Invention

The present invention relates to isocyanate-free coating compositions containing (1) at least one polymer and/or oligomer selected from the group consisting of acrylic, urethane and urea polymers and oligomers and combinations thereof having a number average molecular weight of at least about 100 and bearing at least two specific aziridine groups and (2) at least one polymer and/or oligomer selected from the group consisting of acrylic, urethane and urea polymers and oligomers and combinations thereof having a number average molecular weight of at least about 100 and bearing at least two specific epoxy groups capable of forming a durable coating under ambient conditions.

2. Brief Description of Prior Art

Known compositions which cure at low temperatures, for example, at ambient conditions, for use as highly durable automotive topcoats are usually based on two-package systems. These include, for example, hydroxy functional components cured with either isocyanate or anhydride functional components.

The use of isocyanate functional components requires that specific precautions be taken based on toxicity considerations. Such necessary precautions can be relatively burdensome in areas where said materials are used but controlled conditions do not exist or are difficult to obtain. One such example of a generally non-controlled environment is an automobile body repair shop. The application of isocyanate-containing materials is relatively hazardous to exposed workers without proper protection. However, isocyanate/polyol cured compositions deliver the quality and durability demanded by the user. If the crosslinking composition is an anhydride/polyol system, the general overall appearance of the cured coating, i.e. gloss and D.O.I. (depth of image), is inferior to isocyanate-cured coatings. Accordingly, there is an urgent need for high quality, durable coating compositions which cure under ambient conditions, are relatively non-toxic and have the aesthetic appearance of an isocyanate-cured composition.

The present invention addresses these issues. The coating compositions disclosed and claimed herein are not isocyanate curing, are relatively non-toxic compared to isocyanate, are curable at ambient temperature and are equal, or even better, in performance and appearance to both isocyanate/polyol or anhydride/polyol cured compositions.

In the prior art, there is disclosed the curing of diepoxides with a combination of diaziridines and diphenols. The epoxies used are aromatic based or glycidyl functional bisphenol A materials. Such epoxies are not suitable for application to a substrate where high durability is required, such as in refinishing of automobile surfaces.

British Patent No. 1,190,979 to Strother discloses a coating composition comprising a diepoxide, a diphenol and a diaziridine. The diaziridine compounds used are those in which the aziridinyl groups are tertiary amine groups, preferably defined by the following formula

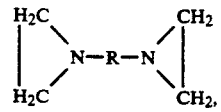

wherein R is a divalent hydrocarbon radical having 1 to 10 carbon atoms. Diepoxides that are used include diglycidyl ether, the diglycidyl ethers of bisphenols, diglycidyl ether adduct of adipic acid, vinyl cyclohexene dioxide and the diglycidyl ethers of polyhydric aliphatic alcohols. Diphenols, a necessary component of the system, include bisphenol A, bisphenol F, hydroquinone and resorcinol. The present invention does not require diphenols to obtain curing. Curing of the above mixture requires elevated temperatures in the range of 100° to 200° C. for a period of 10 minutes to one hour. The epoxides and diphenols used by Strother contribute to poor durability and therefore are not useful for automotive topcoat compositions. In addition, curing at elevated temperatures further render such compositions unattractive for use in the automotive refinishing industry.

In U.S. Pat. No. 3,763,100, Martin et al relate to coating compositions containing an epoxy-bisphenol adduct, an adduct of an aziridine compound with a polyepoxide and, optionally, a mono-functional secondary amine that can be air dried or baked at temperatures of from about 25° to about 400° C. for about five minutes to about 24 hours. Martin et al thus use an aromatic diphenol and, as with Strother, produce a composition not useful for durable automotive refinish topcoats. In fact, Martin et al's coating is used as a metal primer coating to improve adhesion between said primer and a subsequent topcoat.

Strother et al in U.S. Pat. No. 3,346,533 disclose the use of a diphenol for curing a diaziridine compound with cycloaliphatic 1,2-diepoxides. This patent is similar to British Patent No. 1,190,979 to Strother, supra, and for the same reason neither discloses nor teaches the compositions and processes claimed herein.

SUMMARY OF THE INVENTION

The present invention is directed to isocyanate-free coating compositions, capable of forming a durable coating under ambient conditions, containing the following components:

(A) at least one polymer, oligomer or a combination thereof selected from the group consisting of acrylic, urethane and urea, polymers and oligomers having a number average molecular weight of at least about 100 and bearing at least two aziridinyl groups defined by the following structural formula:

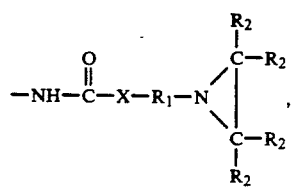

wherein

X represents O, S, NH or NR, wherein R represents an alkyl group having from one to 12 carbon atoms, or higher, or a phenyl group, $R_1$ represents $(CH_2)m_1$, $m_1$ being an integer ranging from 1 to 3 and $R_2$ represents H, $CH_3$ or a combination thereof; and a member selected from the group consisting of (B) and (C) wherein (B) is at least one polymer, oligomer or a combination thereof selected from the group consisting of acrylic, urethane and urea polymers and oligomers having a number average molecular weight of at least about 100 and bearing at least two groups selected from epoxy groups defined by one of the following structural formulas:

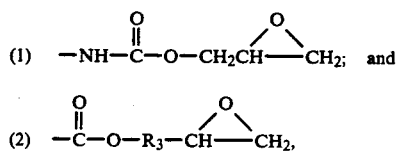

wherein $R_3$ represents $(CH_2)m_2$, $m_2$ being an integer ranging from 1 to 2; and (C) is a polymer or oligomer represented by the following structural formula:

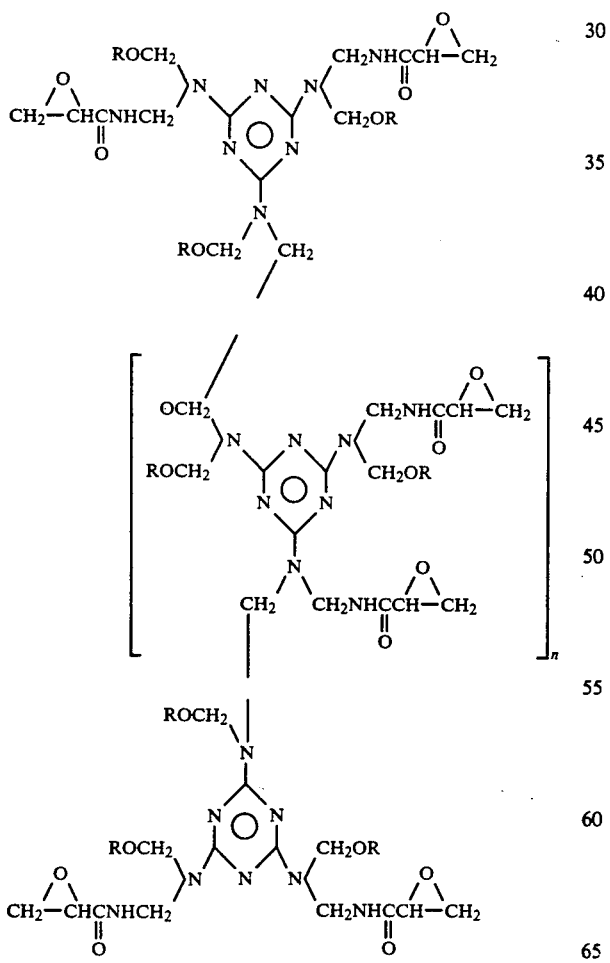

wherein R represents an alkyl group having from one to 20 carbon atoms and n=0–20.

DETAILED DESCRIPTION OF THE INVENTION

The present invention is directed to isocyanate-free coating compositions, capable of forming a durable coating under ambient conditions, particularly suitable as coating compositions for coating substrates, especially automotive bodies and parts, and which are relatively non-toxic, containing the following components:

(A) at least one polymer, oligomer or a combination thereof selected from the group consisting of acrylic, urethane and urea polymers and oligomers having a number average molecular weight of at least about 100, preferably from about 100 to about 20,000, and bearing at least two, preferably from two to about 75, aziridinyl groups defined by the following structural formula:

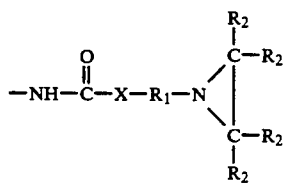

wherein

X represents O, S, NH or NR, wherein R represents alkyl having from one to 12 carbon atoms, or higher, or phenyl, $R_1$ represents $(CH_2)m_1$, $m_1$ being an integer ranging from 1 to 3, preferably 2, and $R_2$ represents H, $CH_3$ or a combination thereof, preferably H, and a member selected from the group consisting of (B) and (C) wherein (B) is at least one polymer, oligomer or combinations thereof selected from the group consisting of acrylic, urethane and urea polymers and oligomers having a number average molecular weight of at least about 100, preferably from about 100 to about 20,000, and bearing at least two, preferably from two to about 75, epoxy selected from epoxy groups defined by one of the following structural formulas:

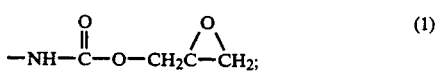

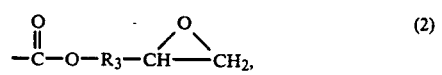

wherein $R_3$ represents $(CH_2)m_2$, $m_2$ being an integer ranging from 1 to 2, preferably 1;

(C) is a polymer or oligomer represented by the following structural formula:

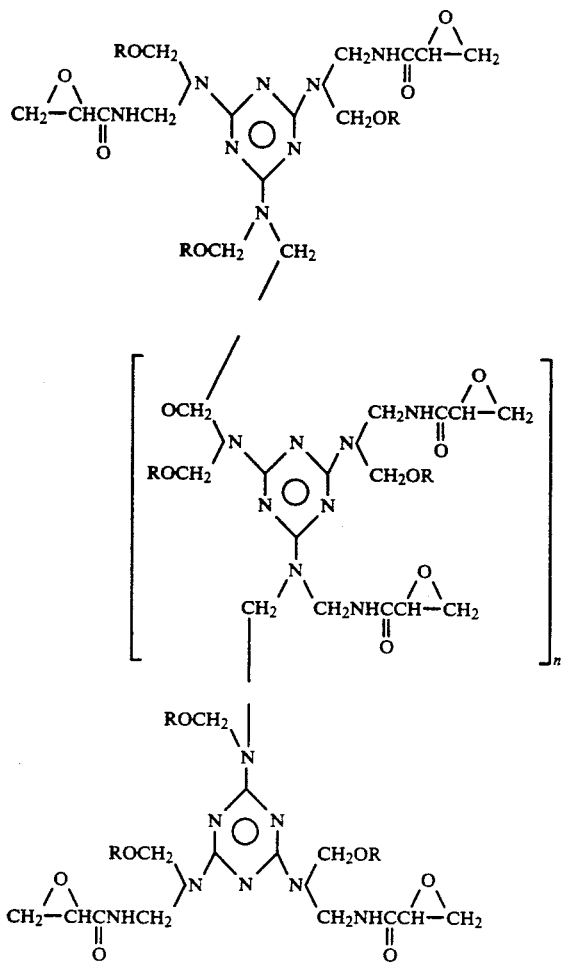

wherein R represents an alkyl group having from one to 20 carbon atoms and n=0-20.

Component A can be prepared, for example, from the reaction of isocyanate functional acrylic, urethane or urea polymers and/or oligomers with, for example, hydroxy, amino or mercapto functional alkyl aziridines. Examples of procedures suitable for the preparation of acrylic polymers that can be used herein are disclosed in U.S. patent application Ser. No. 07/643,253 of Charles M. Kania, filed on Jan. 22, 1991, for Aziridine Compounds, Acrylic Polymers Containing Same and Coating Compositions Containing Said Polymers, assigned to the same assignee as the present patent application.

Component B(1) can be obtained, for example, from the reaction of isocyanate functional acrylic, urethane or urea polymers and/or oligomers with glycidol.

Component B(2) is commercially available from MONSANTO Corporation under the Trade Name LSE-120 Light Stable Epoxy.

Component B(3) can be obtained, for example, from the free radical polymerization of ethylenically-unsaturated monomers, of which one will be selected from glycidyl functional acrylate or methacrylates, such as glycidyl acrylate or glycidyl methacrylate.

The number average molecular weight is determined by gel permeation chromatography using a polystyrene standard.

In measuring the number average molecular weight using polystyrene as the standard, a Waters Associates gel permeation chromatography Model 201 was used. Six micro-Styragel columns were used. Each column measured 30 centimeters in length and had an inside diameter of 7.8 millimeters. A differential refractometer was used as detector, and the columns were arranged according to their pore size on the order of $10^3$, $10^4$, $10^5$, $10^6$, 500, 100 Angstroms with the $10^3$ Angstrom column being the first one. Tetrahydrofuran was used as a solvent with a flow rate of 2.0 milliliters/minute. The quality of the columns is checked by their "theoretical plate number" determined from orthodichlorobenzene. For the purposes of this application, those columns with theoretical plate numbers greater than 3000/30 cm were used.

To determine molecular weight by gel permeation chromatography (GPC), the instrument is first calibrated using a polystyrene standard. Polystyrene standards used were purchased from Pressure Chemicals Company, Pittsburgh, PA. The polystyrene standards have dispersities (dispersity=weight average molecular weight/number average molecular weight) ranging from 1.05 to 1.10. The viscosity average molecular weight of the polystyrene standards used were 850,000; 233,000; 47,400; 17,400 and 3,600. To obtain a calibration curve, a set of 0.1 percent (10 milligram polystyrene/1.0 ml tetrahydrofuran) polystyrene solutions in tetrahydrofuran were prepared, and a GPC chromatogram was obtained. The elution volume of each peak corresponding to a given molecular weight of the polystyrene standard was measured, and the data was plotted on a semilogarithmic paper (logarithm scale in the ordinate and linear scale in the abscissa). A linear least squares plot to $\log_{10}$ (molecular weight) versus elution volume in milliliters is used as a calibration curve. The lowest molecular weight of the polystyrene standard used was 3,600, and the calibration curve beyond that was extrapolated down to 100. The upper and lower exclusion limits of this set of columns are 5,000,000 and 100, respectively, in terms of polystyrene molecular weight. The sample whose molecular weights are to be determined was prepared as a 1.0 percent tetrahydrofuran solution. After filtration through a 0.5 micron filter, available from Millapore Corporation, a 0.5 ml sample size was injected into the columns and a GPC chromatogram obtained under the same experimental conditions as the calibration. From the resulting calibration curve of molecular weight versus retention time, a molecular weight relative to the standard can be assigned to the retention times of the sample. The height (H) of the curve at the corresponding retention times is recorded by the computer. From these height-molecular weight (M) combinations, the following averages are calculated: Number average molecular weight=$\Sigma H/\Sigma H/M$. This is the number reported.

The invention herein is also directed to processes for coating a substrate using such compositions.

The coating composition herein is usually a two-package composition, that is, the aziridine component and the epoxy component are usually mixed, at ambient temperature, just prior to their application to a substrate. The two components can be used such that the range of aziridine (equivalents) to epoxy (equivalents) is from about 3:1 to about 1:3, preferably about 1:1. There is generally associated with two-package component compositions a "pot life", which is defined as the useful time interval between mixing of the components and the application thereof to the substrate. Generally, such time is about eight hours.

The coating composition defined and claimed herein can be applied to the substrate by any conventional technique, such as spraying, brushing, dipping, rolling, etc., with the preferred method being spraying. Additionally, the components can be devolatalized and converted into sprayable powder form. The coating composition can be applied onto many substrates, such as metals, for example, steel and aluminum, wood, glass, plastics, concrete, etc. Additionally, the substrate can be primed or electrocoated prior to applying thereto the coating composition of this invention. The topcoat composition can be a pigmented one-coat system or, more preferably, a clear coat over a pigmented base coat.

The coating compositions herein can also contain ingredients, such as inorganic or organic pigments or metal flakes typically used in automobile refinishing operations, plasticizers, inert filters, adhesion promoters, flow additives, thixotropes and additives for sag control and metallic flake orientation (sometimes referred to as microgel) and described in U.S. Pat. Nos. 4,025,474, 4,055,607, 4,075,141, 4,115,472, 4,147,688, 4,180,489, 4,242,384, 4,268,547 and 4,290,932, the disclosures of which are hereby incorporated by reference, and other such formulating additives.

The coating compositions herein containing the defined aziridines and epoxies are usually solutions in organic solvents, although other forms can also be used, such as aqueous dispersions, non-aqueous dispersons and powder forms. Common examples of organic solvents that can be used include esters, such as butyl acetate; ketones, such as methyl isobutyl ketone; aromatic hydrocarbons, such as xylene; and glycol ethers, such as propylene glycol methyl ether acetate. The solvents or carriers can be used in a range of about 20 to about 70 weight percent, based on the final coating composition.

The coating compositions herein are most useful for refinishing automobiles. The curing of the components can, preferably, be achieved at ambient conditions; or the cure can be promoted at elevated temperatures if desired.

DESCRIPTION OF PREFERRED EMBODIMENTS

EXAMPLE 1

50.72 grams of hydroxy ethyl ethyleneimine were added to 200.0 grams of T-1890L, the isocyanurate of isophorone diisocyanate (obtainable from HULS) over a period of one hour at temperatures ranging from 25° to 47° C. and then maintained at such temperature for 30 minutes. 42.7 grams of hexyl acetate were then added to the mixture along with 0.2 gram of dibutyl tin dilaurate, and the reaction temperature was raised to 85° to 91° C. and maintained within the latter temperature range for an additional 30 minutes. The resulting product showed no NCO peak in the IR, had a non-volatile content of 66.3 percent (110° C./one hour), a Gardner viscosity of $Z^8$ a number average molecular weight of 1063 and a theoretical aziridine equivalent weight of 327 (solid).

A coating composition was prepared by mixing the following materials:

| Component | Parts by Weight, Grams |
| --- | --- |
| Aziridine Resin obtained above | 81.2 |
| Polysiloxane solution[1] (flow control) | 1.0 |
| U.V. Absorber[2] | 3.0 |

| Component | Parts by Weight, Grams |
| --- | --- |
| Toluene (solvent) | 15.9 |
| Propylene Glycol Methyl Ether Acetate (solvent) | 26.4 |
| Butyl Acetate (solvent) | 35.1 |
| Ethyl-3-Ethoxy Propionate (solvent) | 10.5 |
| Epoxy Resin[3] | 86.2 |

[1]Available from DOW Corning Corporation as DC 200, 135 csk dissolved in xylene to give a 0.5 weight percent polysiloxane content.
[2]Available from Ciba-Geigy Corp. as TINUVIN 328.
[3]A melamine-based epoxy oligomer available from MONSANTO Chemical Co. as LSE-120.

The above clearcoat package was then spray applied to 24 gauge cold rolled steel panels (treated with BONDERITE 40, primed with DP-40/401, a two-component epoxy primer from PPG INDUSTRIES, INC., and basecoated with DELTRON® Universal Basecoat from PPG INDUSTRIES, INC.). The clearcoat film was allowed to cure at ambient conditions. The resulting coating was found to have the following properties after a one-week cure time:

| | |
| --- | --- |
| 20 Degree Gloss: | 95 |
| D.O.I.: | 70 |
| Pencil Hardness: | B |
| Solvent Resistance: | Excellent |

EXAMPLE 2

96.4 grams of hydroxy ethyl ethyleneimine and 20 grams of 1,3-dimethyl-2-imidazolidinone were added to 400 grams of isocyanurate of isophorone diisocyanate (T-1890L) over a period of one hour at temperatures ranging from 23° to 50° C. Upon completion of the feed 1.2 grams of butanol and 0.4 gram of dibutyl tin dilaurate were added and the temperature was raised to 70° C. The reaction was held at this temperature until the NCO disappeared by IR (about one hour). 121 grams of butanol and 10 grams of 1,3-dimethyl-2-imidazolidinone were then added to the reaction mixture. The product showed no NCO in the IR, had a non-volatile content of 61.7 weight percent (110° C./one hour), a Gardner viscosity of X-Y a number average molecular weight of 1003 and a theoretical aziridine equivalent weight of 327 (solid).

A solution of glycidyl functional urethane polymer was then prepared as follows. 4180 grams of dibasic ester (obtainable from Dupont Corporation), 2950 grams of 1,6-hexanediol, 1800 grams of cyclohexane dimethanol, 3.6 grams of 50 weight percent aqueous hypophosphorous acid solution, 7.1 grams of butane sulfonic acid and 7.1 grams of t-butyl titanate were added to a 12-liter round bottom flask equipped with a stirrer thermometer, nitrogen inlet and distillation receiver and was heated to a maximum temperature of 210° C. to remove methyl alcohol therefrom, using a nitrogen sparge to facilitate such removal. Over a nine-hour period 1487 grams of methyl alcohol was removed from the reaction mixture, the remainder was cooled to 115° C. and then 1246.4 grams of methyl isobutyl ketone were added thereto, resulting in a hydroxy functional polymer.

To a three-liter round bottom flask equipped with a nitrogen inlet, stirrer, thermometer and condenser, there was added 390.6 grams of Desmodur N 3390 (a trimer of hexamethylene diisocyanate available from MOBAY), 103.1 grams of the hydroxy functional polymer obtained above, 0.06 gram of dibutyl tin dilaurate and 347.1 grams of methyl isobutyl ketone. The resulting mixture was heated to 80° C., while watching for an exotherm at 50° C., and then held at 80° C., until the isocyanate equivalent weight reached about 600. The reaction mixture was then cooled to 50° C., after which 210.9 grams of glycidol and 30 grams of methyl isobutyl ketone were added thereto. The reaction mixture was held at 50° C. until the NCO peak disappeared from IR (about three hours) and there were then added 14.5 grams of absolute ethanol and cooled to room temperature. The product obtained was a glycidyl based urethane having no NCO peak in the IR, a non-volatile content of 49.0 weight percent, a GPC number average molecular weight of 2530 and a GPC peak molecular weight of 7530.

A coating composition was prepared by mixing the following materials:

| Component | Parts by Weight, Grams |
|---|---|
| Aziridine Resin obtained above | 76.5 |
| Polysiloxane solution[1] | 1.0 |
| Additive[2] | 1.0 |
| U.V. Absorber[3] | 3.0 |
| Toluene | 13.3 |
| Propylene Glycol Methyl Ether Acetate | 22.2 |
| Ethylene Glycol Butyl Ether Acetate | 22.2 |
| Butyl Acetate | 29.4 |
| Ethyl-3-Ethoxy Propionate | 8.9 |
| Epoxy Resin (Glycidyl based Urethane obtained above) | 100.2 |

[1]Same as used in Example No. 1.
[2]Slip and mar additive available from BYK-MALLINCKRODT as BYK-300
[3]Same as used in Example No. 1.

The above clearcoat package was then spray applied to 24 gauge cold rolled steel panels (treated with BONDERITE 40, primed with DP-40/401 and basecoated with DELTRON ® Universal Basecoat). The clearcoat film was allowed to cure at ambient conditions. The resulting coating was found to have the following properties after a one-week cure time:

| 20 Degree Gloss: | 86 |
|---|---|
| D.O.I.: | 65 |
| Pencil Hardness: | 4B |
| Solvent Resistance: | Excellent |

EXAMPLE 3

To 2400 grams of refluxing xylene was added a mixture of 750 grams of styrene, 750 grams of methyl methacrylate, 2250 grams of isobornyl methacrylate, 3750 grams of glycidyl methacrylate and an initiator solution containing 250 grams of Lupersol 555 (t-amyl peracetate from Atochem) and 746 grams of xylene. The monomer solution was added over a period of three hours and the initiator solution over a period of 3.5 hours. Upon completion of such additions, 300 grams of xylene were added to the mixture. One hour after the latter addition, there were added 37.5 grams of di-t-butyl peroxide and the reaction mixture was held for an additional two hours. Reflux conditions were maintained throughout the reaction. The product obtained was a glycidyl methacrylate functional acrylic resin having a non-volatile content of 75.2 weight percent (150° C./two hours), a Gardner Viscosity of $Z^7$, a GPC number average molecular weight of 2559, and an epoxy equivalent weight of 375 (solution).

A coating composition was prepared by mixing the following materials:

| Component | Parts by Weight, Grams |
|---|---|
| Aziridine Resin used in Example 1 | 80.3 |
| Polysiloxane solution[1] | 1.0 |
| Additive[2] | 1.0 |
| U.V. Absorber[3] | 3.0 |
| Toluene | 19.0 |
| Propylene Glycol Methyl Ether Acetate | 31.6 |
| Ethylene Glycol Butyl Ether Acetate | 31.6 |
| Butyl Acetate | 41.9 |
| Ethyl-3-Ethoxy Propionate | 12.6 |
| Epoxy Resin (glycidyl methacrylate resin obtained above) | 63.7 |

[1]Same as used in Examples Nos. 1 and 2.
[2]Same as used in Example No. 2.
[3]Same as used in Examples Nos. 1 and 2.

The above clearcoat package was then spray applied to 24 gauge cold rolled steel panels (treated with Bonderite 40, primed with DP 40/401 and basecoated with DELTRON ® Universal Basecoat). The clearcoat film was allowed to cure at ambient conditions. The resulting coating was found to have the following properties after a one-week cure time:

| 20 Degree Gloss: | 92 |
|---|---|
| D.O.I.: | 80 |
| Pencil Hardness: | 4B |
| Solvent Resistance: | Excellent |

EXAMPLE 4

80.17 grams of hydroxy ethyl ethyleneimine and 45.1 grams of butyl acetate were added to 70 percent isocyanate prepolymer solution in butyl acetate based on three moles of m-TMXDI (a diisocyanate available from American Cyanamid) and one mole of trimethylolpropane over a period of one hour at a temperature of 25° to 61° C. Upon completion of the addition, 3.6 grams of butyl alcohol and 0.34 gram of dibutyl tin dilaurate were added and the temperature raised to 85° C. The reaction was held for two hours at this temperature until the NCO disappeared by IR. 38.1 grams of butyl acetate were then added. The product showed no isocyanate peak in the IR, had a non-volatile content of 63.2 percent (110°/hour), a Gardner viscosity of $Z^4$ and a theoretical aziridine equivalent weight of 348.5 (solid) a GPC number average molecular weight of 1134 and a GPC peak molecular weight of 2524.

A coating composition was prepared by mixing the following materials:

| Component | Parts by Weight, Grams |
|---|---|
| Aziridine Resin obtained above | 100.0 |
| Polysiloxane solution[1] | 1.0 |
| Additive[2] | 1.0 |
| U.V. Absorber[3] | 3.0 |
| Toluene | 19.0 |
| Propylene Glycol Methyl Ether Acetate | 31.6 |
| Ethylene Glycol Butyl Ether Acetate | 31.6 |
| Butyl Acetate | 41.9 |
| Ethyl-3-Ethoxy Propionate | 12.6 |

-continued

| Component | Parts by Weight, Grams |
|---|---|
| Epoxy Resin[4] | 44.0 |

[1]Same as used in Example 1.
[2]Same as used in Example 2.
[3]Same as used in Example 1.
[4]A melamine-based epoxy oligomer available from MONSANTO Chemical Co. as LSE-20.

The above clearcoat package was then spray applied to 24 gauge cold-rolled steel panels (treated with BONDERITE 40, primed with DP-40/401, a two-component epoxy primer from PPG INDUSTRIES INC., PPG FINISHES, and basecoated with DELTRON® Universal Basecoat from PPG INDUSTRIES INC., PPG FINISHES). The clearcoat film was allowed to cure at ambient conditions. The resulting coating was found to have the following properties after a one-week cure time.

| | |
|---|---|
| 20 Degree Gloss: | 92 |
| D.O.I.: | 80 |
| Pencil Hardness: | 4B |
| Solvent Resistance: | Excellent |

EXAMPLE 5

In this Example 5, which was used as an isocyanate/polyol control, it can be seen that isocyanate/polyol cured systems, which are toxic, do not result in a coating having all of the desirable properties obtained using the novel compositions defined and claimed herein. Thus, a clearcoat paint commercially available from PPG INDUSTRIES INC., PPG FINISHES under the trade name DELTRON® DAU-82, containing an isocyanate and a polyol as component, was spray applied to 24 gauge cold rolled steel panels (treated with BONDERITE 40, primed with DP 40/401, a two-component epoxy primer from PPG INDUSTRIES INC., PPG FINISHES, and basecoated with DELTRON® Universal Basecoat from PPG INDUSTRIES, INC., PPG FINISHES). The clearcoat film was allowed to cure at ambient conditions. The resulting coating was found to have the following properties after a one-week cure time:

| | |
|---|---|
| 20 Degree Gloss: | 91 |
| D.O.I.: | 65 |
| Pencil Hardness: | 5B |
| Solvent Resistance: | Fair |

EXAMPLE 6

It can be seen in this Example 6 that when compositions are used containing a bisphenol A type epoxy for curing, the coatings obtained are nondurable and much inferior to the coatings resulting from the use of the novel compositions defined and claimed herein. Thus, a clearcoat composition containing the following materials was prepared:

| Component | Parts by Weight, Grams |
|---|---|
| Aziridine Resin obtained in Example 4 | 100.0 |
| Polysiloxane solution[1] | 1.0 |
| Additive[2] | 1.0 |
| U.V. Absorber[3] | 3.0 |
| Toluene | 20.8 |
| Propylene Glycol Methyl Ether Acetate | 33.4 |
| Ethylene Glycol Butyl Ether Acetate | 33.4 |
| Butyl Acetate | 43.7 |
| Ethyl-3-Ethoxy Propionate | 14.4 |
| Epoxy Resin[4] | 35.0 |

[1]Same as used in Example 1.
[2]Same as used in Example 2.
[3]Same as used in Example 3.
[4]A bisphenol A type epoxy available from SHELL Chemical Co. as EPON 1001F.

The clearcoat package was spray applied to 24 gauge cold rolled steel panels (treated with BONDERITE 40, primed with DP 40/401, a two-component epoxy primer from PPG INDUSTRIES INC., PPG FINISHES, and basecoated with DELTRON® Universal Basecoat from PPG INDUSTRIES INC., PPG FINISHES). The clearcoat film was allowed to cure at ambient conditions. The resulting coating was found to have the following properties after a one-week cure time.

| | |
|---|---|
| 20 Degree Gloss: | 96 |
| D.O.I.: | 80 |
| Pencil Hardness: | 6B |
| Solvent Resistance: | Excellent |

The data obtained above are summarized below in Table I.

TABLE I

| Example | Epoxy | Gloss[1] | D.O.I.[2] | Pencil Hardness | Solvent[3] Resistance | Q.U.V.[4] Percent Gloss Retention | Blushing[5] Tendency |
|---|---|---|---|---|---|---|---|
| 1 | LSE-120 | 95 | 70 | B | Excellent | 93 | None |
| 2 | Glycidyl Functional Urethane | 86 | 65 | 4B | Excellent | 100 | None |
| 3 | Glycidyl Methacrylate Acrylic | 92 | 80 | 4B | Excellent | 100 | None |
| 4 | LSE-120 | 92 | 80 | 4B | Excellent | 100 | None |
| 5 | (Control) Isocyanate Cured | 91 | 65 | 5B | Fair | 100 | None |
| 6 | EPON 1001 L | 96 | 80 | 6B | Excellent | 14 | Severe |

[1]20 Degree Gloss
[2]Depth-of-Image
[3]Gasoline Spot Resistance
[4]300 Hours Accelerated Weathering
[5]Tendency to Blush and Whiten During Q.U.V. Exposure According to the provisions of the patent statutes, there are described above the invention and what are

What is claimed is:

1. Isocyanate-free coating compositions, capable of forming a durable coating under ambient conditions, comprising (A) at least one polymer, oligomer or a combination thereof selected from the group consisting of acrylic, urethane and urea polymers and oligomers having a number average molecular weight of at least about 100 and bearing at least two aziridinyl groups defined by the following structural formula:

$$-NH-\overset{O}{\underset{\|}{C}}-X-R_1-N\diagup\overset{\underset{|}{C}-R_2}{\underset{\underset{R_2}{|}}{\overset{|}{C}-R_2}}\diagdown\overset{R_2}{\underset{R_2}{|}}$$

wherein

X represents O, S, NH or NR, wherein R represents an alkyl group or a phenyl group, $R_1$ represents $(CH_2)_{m_1}$, $m_1$ being an integer ranging from 1 to 3 and $R_2$ represents H, $CH_3$ or a combination thereof; and a member selected from the group consisting of (B) and (C) wherein (B) is at least one polymer, oligomer or a combination thereof selected from the group consisting of acrylic, urethane and urea polymers and oligomers having a number average molecular weight of at least about 100 and bearing at least two groups selected from epoxy groups defined by one of the following structural formulas:

(1) $-NH-\overset{O}{\underset{\|}{C}}-O-CH_2CH\overset{O}{\diagdown\diagup}CH_2;$ and (2) $-\overset{O}{\underset{\|}{C}}-O-R_3-CH\overset{O}{\diagdown\diagup}CH_2,$ wherein $R_3$ represents $(CH_2)_{m_2}$, $m_2$ being an integer ranging from 1 to 2; and (C) is a polymer or oligomer represented by the following structural formula:

[structural formula of triazine-based oligomer]

wherein R represents an alkyl group having from one to 20 carbon atoms and n=0–20.

2. Compositions according to claim 1 wherein Component (A) is an acrylic polymer.

3. Compositions according to claim 1 wherein Component (B) is an acrylic polymer.

4. Compositions according to claim 1 wherein each of Components (A) and (B) are acrylic polymers.

5. Compositions according to claim 1 wherein Component (A) is a urethane polymer.

6. Compositions according to claim 1 wherein Component (B) is a urethane polymer.

7. Compositions according to claim 1 wherein each of Components (A) and (B) are urethane polymers.

8. Compositions according to claim 1 wherein Component (A) is a urea polymer.

9. Compositions according to claim 1 wherein Component (B) is a urea polymer.

10. Compositions according to claim 1 wherein each of Components (A) and (B) are urea polymers.

11. Compositions according to claim 1 wherein the number average molecular weight of Component (A) is from about 100 to about 20,000.

12. Compositions according to claim 1 wherein the number average molecular weight of Component (B) is from about 100 to about 20,000.

13. Compositions according to claim 1 wherein the number of aziridinyl groups in Component (A) are from two to about 75.

14. Compositions according to claim 1 wherein the number of epoxy groups in Component (B) are from two to about 75.

15. Compositions according to claim 1 wherein the number of aziridinyl groups in Component (A) are from two to about 75 and the number of epoxy groups in Component (B) are from two to about 75.

16. Compositions according to claim 1 wherein X=O, $m_1$ is the integer 2, $R_2$ represents H and $m_2$ is the integer 1.

17. Compositions according to claim 1 wherein the range of aziridine (equivalents) to epoxy (equivalents) is from about 3:1 to about 1:3.

18. Compositions according to claim 1 wherein the range of aziridine (equivalents) to epoxy (equivalents) is about 1:1.

* * * * *